March 8, 1938.     N. WINDSOR     2,110,540
DEVICE FOR REMOVING LIQUID FROM BOTTLES
Filed Sept. 29, 1937
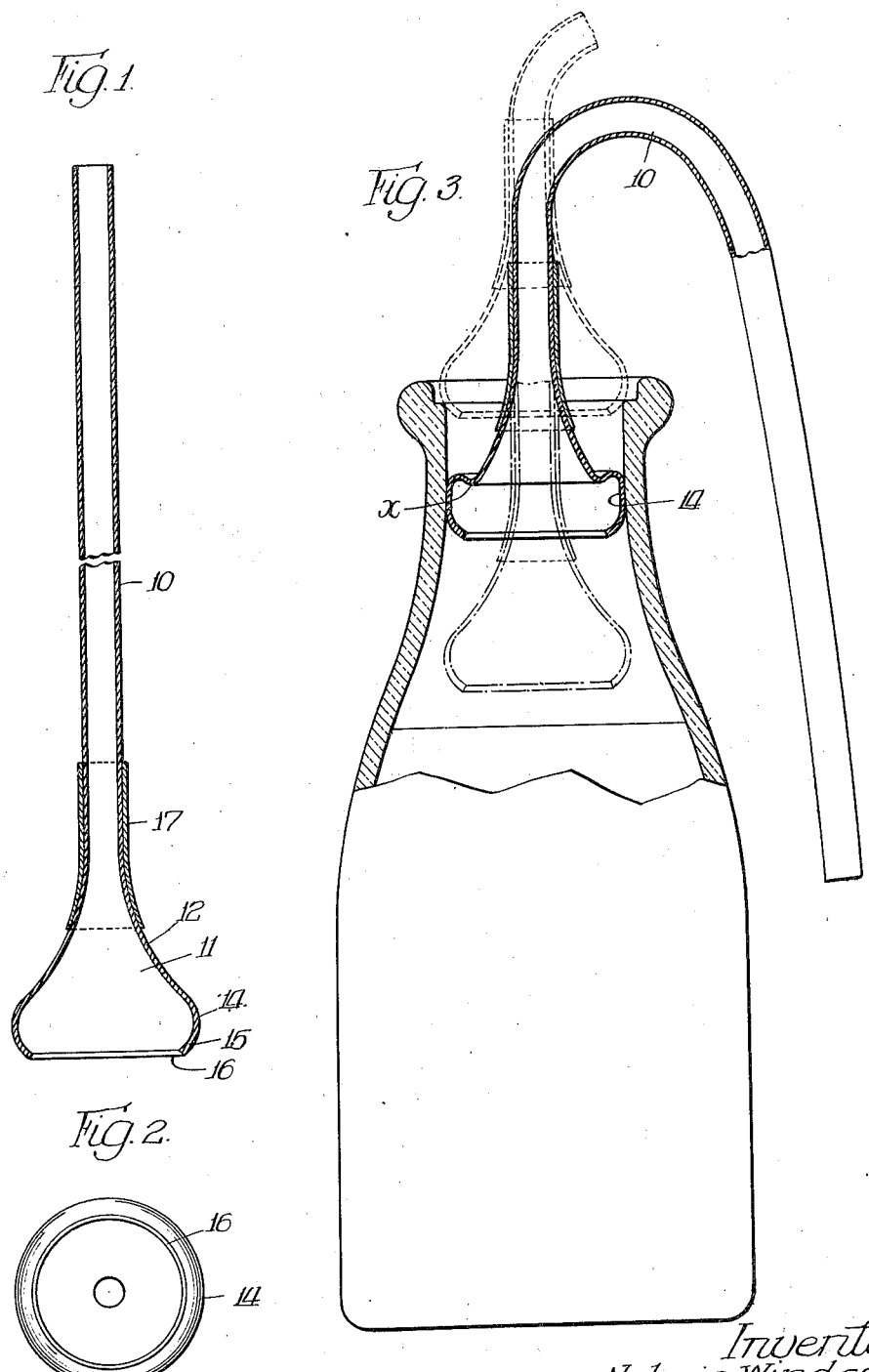
Inventor:
Nelson Windsor;
By Cromwell, ——— attys.

Patented Mar. 8, 1938

2,110,540

UNITED STATES PATENT OFFICE 2,110,540

DEVICE FOR REMOVING LIQUID FROM BOTTLES

Nelson Windsor, South Bend, Ind.

Application September 29, 1937, Serial No. 166,321

6 Claims. (Cl. 137—20)

This invention relates to devices for removing liquid from bottles, for example, for drawing off cream from the upper portions of milk bottles.

The objects of the invention include the provision of a very simple device which is easily cleaned and which can be manipulated and operated with facility.

A particular object of the invention is the provision of such a device which operates as a siphon and which is effective automatically to start the siphonic action incident to its insertion into the bottle.

Other and further objects of the invention will be pointed out and indicated hereinafter or will be apparent from the following description of an illustrative embodiment of it.

For purpose of aiding in an explanation of the invention I show in the accompanying drawing forming a part of this specification, and hereinafter described, one form in which it may be embodied, but it is to be understood that this is presented merely for purpose of illustration and is not to be construed in any fashion for limiting the appended claims short of the true and most comprehensive scope of the invention in the art.

In the drawing,

Fig. 1 is a broken longitudinal section of an embodiment of the invention;

Fig. 2 is an end view of same, as seen from the lower end of Fig. 1; and

Fig. 3 is a sectional view illustrating the use and operation of the device in connection with a milk bottle of conventional form.

The device illustrated in the drawing comprises a tube 10, which preferably is formed of flexible rubber but which may be formed of other suitable material, which tube carries at one of its ends a cup or bell-like portion 11. This bell portion may be formed as an integral continuation and enlargement of the tube 10, or it may be made separately and attached to the tube in any appropriate fashion. The bell portion is of circular form and has a flaring wall portion 12 extending to its girth or portion of maximum diameter 14, and a lip portion 15 which converges or gradually decreases in diameter from the girth portion to its margin 16. The walls of this bell portion are resiliently flexible, and to obtain this characteristic, the bell may be made of elastic rubber which tends to hold its normal form but which may be elastically distorted. The adjacent portions of the bell and tube are stiffened longitudinally, as by mounting a stiffening sleeve 17, of rubber or the like, upon them, or by increasing their wall thickness.

The girth of the bell is of such size as to make rubbing contact about its entire periphery against the inner wall surface of the neck portion of a milk bottle of conventional type. Such bottles are fairly well standardized as to the internal diameter and form of their neck portions, but in order to accommodate expected variations in such particulars, the circumference of the girth of the bell portion is preferably made slightly larger than the standardized internal circumference of the bottle neck at its upper end.

The operation of the device is illustrated in Fig. 3, wherein three positions are shown. The upper or dotted line position shows the bell being inserted into the mouth of the bottle. It will be observed that the converging lip portion 15 facilitates the entry of the bell into the bottle neck. From this position the bell is pushed downwardly into the bottle neck, incident to which movement the periphery of the bell slides downwardly in close engagement with the inner wall of the neck. The pressure for thus moving it downwardly is imparted to the bell through the medium of the stiffener 17, which is held in the fingers of the operator, and this downward pressure is transmitted through the flaring wall portion 12 of the bell as an outward radial pressure tending to expand the girth portion, and hence urging it into close rubbing contact with the wall of the bottle neck. At the same time the flaring portion 12 may be somewhat collapsed as illustrated in a general way at $x$ in the intermediate or full line position illustrated in Fig. 3.

The close contact thus maintained between the bell portion and the wall of the bottle neck while the former is being slid downwardly into the bottle forms a seal effective to prevent leakage of the cream past the periphery of the bell, and the liquid which is displaced incident to the intrusion of the bell is forced upwardly through it and through the tube 10. The reduction of the internal capacity of the bell by the partial collapsing of its flaring portion as above described contributes somewhat to the rise of the liquid level in the tube at a rate considerably faster than the downward movement of the bell. Consequently, and in view of the fact that the bell maintains peripheral contact with the wall of the vessel mouth during a substantial extent of its downward travel therein, the column of liquid displaced upwardly through the tube reaches the lower portion of the siphon leg before the bell reaches a position where it is no longer constrained or constricted by the bottle neck. As a consequence, the siphonic action is already started by the time the bell, in its downward movement, clears the constricting or narrow portion of the bottle neck, and inasmuch as the external air pressure then becomes effective on the surface of the liquid within the bottle, the siphoning off of the liquid can continue until its level reaches the lower margin of the bell. The lower or dot-and-dash line position shown in Fig. 3 serves to illustrate a position of the bell when it has moved downwardly beyond the constricting engagement of the bottle neck.

It will be understood that the operation of inserting the bell into the bottle and moving it downwardly therein to the siphoning or free position is accomplished very quickly and as an uninterrupted procedure, with the result that the operation of the device is started automatically and immediately simply by inserting it in the manner described.

The siphoning off of liquid may be stopped at any time simply by pinching the walls of the tube together at the top of the bend, and any liquid then remaining in the rising leg of the siphon will be drawn back into the bottle incident to withdrawal of the bell upwardly through the bottle neck.

The device is particularly suited to household use because it may be easily scalded and cleaned simply by running hot water through it, the bell serving as a funnel in such operation, and because it is non-frangible and so simply operated.

What I claim is:

1. A device for removing liquid from bottles, comprising a tube adapted to function as a siphon and having at one of its ends an enlarged bell-like portion insertable into a bottle of appropriate size, said bell-like portion having a flexible annular wall adapted to slide in peripheral contact with the inner wall of the bottle neck.

2. A device for removing liquid from bottles, comprising a tube adapted to function as a siphon and carrying at one of its ends a bell-like portion having a flaring elastic wall portion merging into an annular elastically deformable girth portion.

3. A device as specified in claim 2 and wherein the annular girth portion merges into an annular lip portion of contracting form.

4. A device as specified in claim 2 and wherein the tube is flexible and has a reinforcement adjacent the flaring wall portion to stiffen the tube longitudinally for a limited distance.

5. A device for removing liquid from bottles comprising a flexible tube adapted to function as a siphon and carrying at one of its ends a flaring bell-like portion having an annular girth susceptible of being elastically constricted by intrusion thereof into the neck of a bottle of appropriate size.

6. A device as specified in claim 5 and wherein the tube is provided with a reinforcement which stiffens it longitudinally for a short distance adjacent the bell-like portion.

NELSON WINDSOR.